US007845599B2

(12) United States Patent
Jackson

(10) Patent No.: US 7,845,599 B2

(45) Date of Patent: Dec. 7, 2010

(54) MOUNTING COUPLING FOR SPRINKLER SUPPORT SYSTEM

(75) Inventor: Eldon D. Jackson, Hastings, MI (US)

(73) Assignee: The Viking Corporation, Hastings, MI (US)

( * ) Notice: Subject to any disclaimer, the term of this patent is extended or adjusted under 35 U.S.C. 154(b) by 712 days.

(21) Appl. No.: 11/689,832

(22) Filed: Mar. 22, 2007

(65) Prior Publication Data

US 2008/0230238 A1 Sep. 25, 2008

(51) Int. Cl.
*F16L 3/00* (2006.01)
*B42F 13/00* (2006.01)
*A62C 37/08* (2006.01)

(52) U.S. Cl. ............................ 248/73; 169/37; 169/41; 239/282; 248/72; 248/231.51; 248/343

(58) Field of Classification Search ............ 248/226.11, 248/227.3, 227.4, 230.4, 231.51, 229.1, 229.13, 248/229.23, 340, 343, 71–73, 75, 62, 65, 248/342, 317; 52/506.03, 506.07, 506.06, 52/506.09; 169/16, 17, 37, 41; 239/280.5, 239/282, 283, 203, 208–209, 600
See application file for complete search history.

(56) References Cited

U.S. PATENT DOCUMENTS

| | | | |
|---|---|---|---|
| 833,613 A | 10/1906 | Maiser | |
| 4,717,099 A | 1/1988 | Hubbard | |
| 4,796,846 A * | 1/1989 | Meier et al. | 248/286.1 |
| 5,263,796 A * | 11/1993 | de Waal | 405/172 |
| 5,535,970 A | 7/1996 | Gobbi et al. | |
| 6,119,784 A | 9/2000 | MacDonald, III et al. | |
| 6,123,154 A | 9/2000 | MacDonald, III et al. | |
| 6,260,810 B1 | 7/2001 | Choi et al. | |
| 6,450,465 B1 * | 9/2002 | Eslick | 248/230.4 |
| 6,488,097 B1 | 12/2002 | MacDonald, III et al. | |
| 6,554,231 B2 | 4/2003 | Choi et al. | |
| 6,622,980 B2 * | 9/2003 | Boucher et al. | 248/231.51 |
| 6,752,218 B2 | 6/2004 | MacDonald, III et al. | |
| 6,811,130 B1 | 11/2004 | Oh et al. | |
| 6,912,959 B2 * | 7/2005 | Kolody et al. | 108/28 |
| 7,032,680 B2 | 4/2006 | MacDonald, III et al. | |
| 7,427,051 B2 * | 9/2008 | Oh | 248/73 |

(Continued)

FOREIGN PATENT DOCUMENTS

JP 51-144828 12/1976

(Continued)

OTHER PUBLICATIONS

Pipe Hangers & Supports (1996); p. 209-211.

(Continued)

*Primary Examiner*—Tan Le
(74) *Attorney, Agent, or Firm*—Harness, Dickey & Pierce, P.L.C.

(57) ABSTRACT

A mounting coupling for a fire sprinkler support system includes an adjustable opening for receiving a sprinkler reducer coupling that allows insertion of the sprinkler coupling into the mounting coupling with a sprinkler head assembled thereto. The mounting coupling can be securely engaged to the reducer coupling and fixed to a support bar of the sprinkler support system using a single fastener thereby providing improved installation and functionality.

15 Claims, 6 Drawing Sheets

U.S. PATENT DOCUMENTS

| | | | | |
|---|---|---|---|---|
| 7,506,845 | B2 * | 3/2009 | Oh | 248/73 |
| 7,735,787 | B2 | 6/2010 | Kafenshtok et al. | |
| 2002/0066834 | A1 * | 6/2002 | Choi | 248/65 |
| 2004/0238697 | A1 | 12/2004 | Heath | |
| 2005/0139743 | A1 | 6/2005 | Shim | |

FOREIGN PATENT DOCUMENTS

| | | |
|---|---|---|
| JP | 6-109167 | 4/1994 |
| JP | 6-337082 | 12/1994 |
| JP | 07-004567 | 1/1995 |
| JP | 9-196241 | 7/1997 |
| JP | 09210256 A | 8/1997 |
| JP | 10160051 | 6/1998 |
| JP | 200392716 | 8/2005 |
| JP | 10-0541361 | 12/2005 |
| KR | 91-2450 | 3/1992 |
| KR | 93-4992 | 7/1993 |
| KR | 010021 | 4/1996 |
| KR | 117170 | 1/1998 |
| KR | 1337-32 | 10/1998 |

OTHER PUBLICATIONS

Viking Technical Data, Flexible Sprinkler Connection (Oct. 20, 1996); Form No. F_070605 (4 pages).
Viking Technical Data, Flexible Sprinkler Connection (Jul. 8, 2005); Form F_070605 (3 pages).
Viking Technical Data, Flexible Sprinkler Connection (Apr. 7, 2006); Form No. F_070605 (3 pages).
Pipe Hangers & Supports, Nichiei Intec; No. 98-1 (6 pages).
Pipe Hangers & Supports, Nichiei Intec; No. 93-1 (3 pages).

* cited by examiner

FIG 2
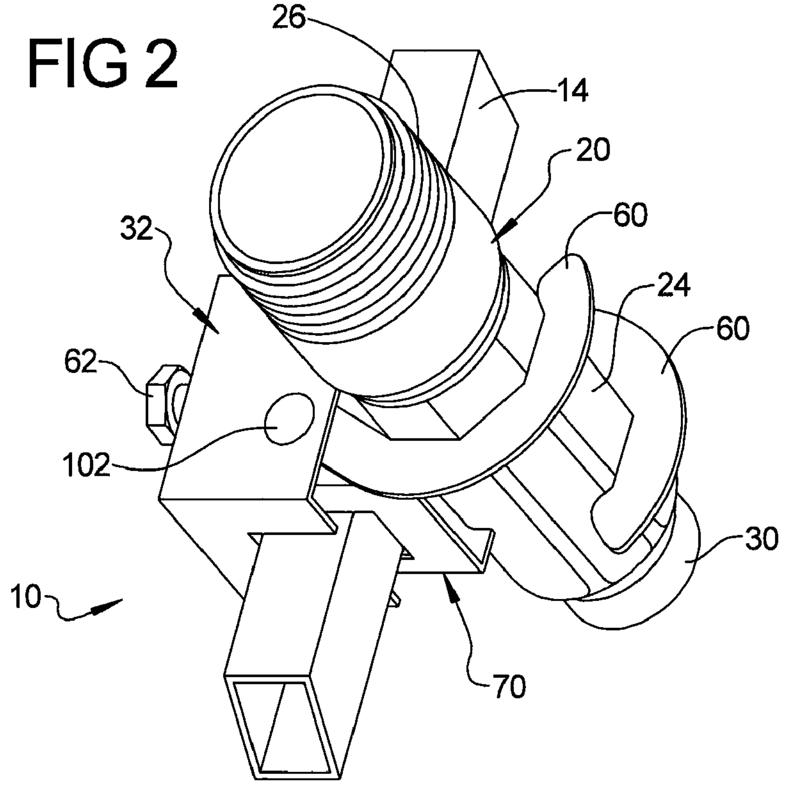
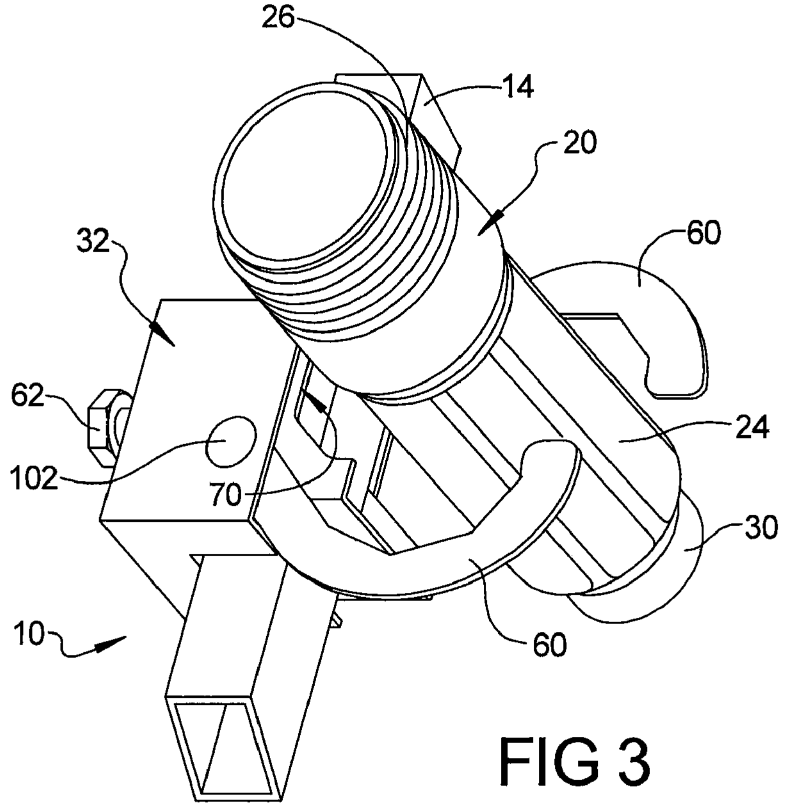
FIG 3

FIG 4
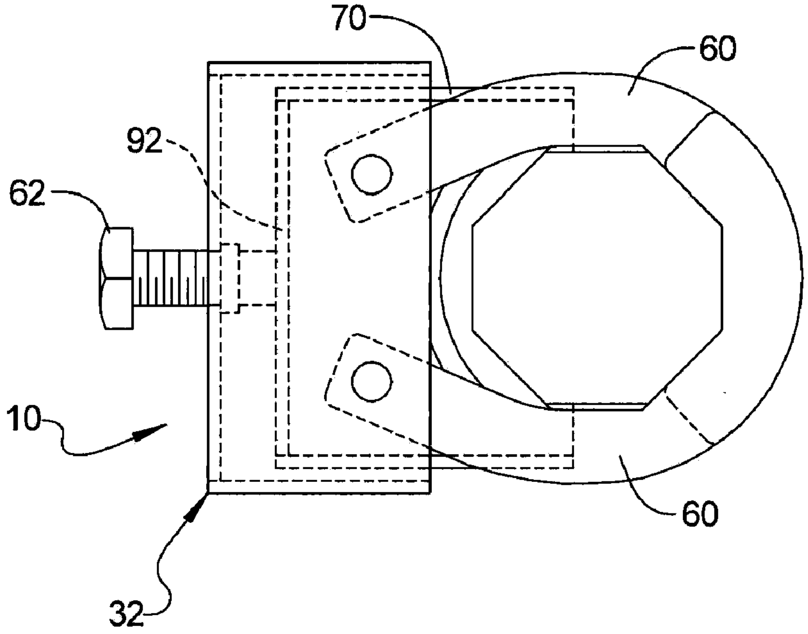
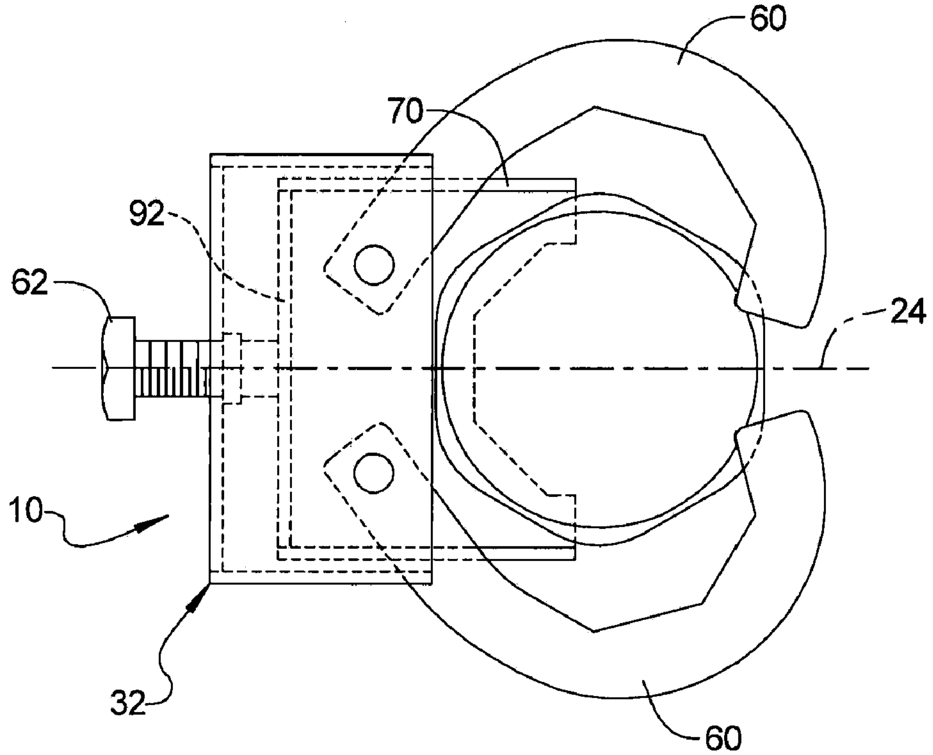
FIG 5

FIG 8
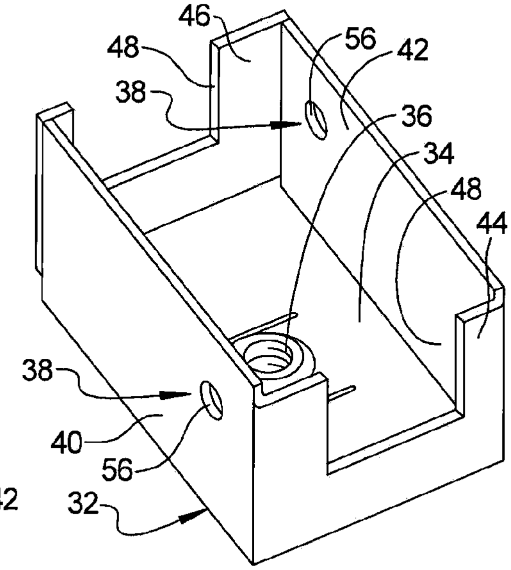
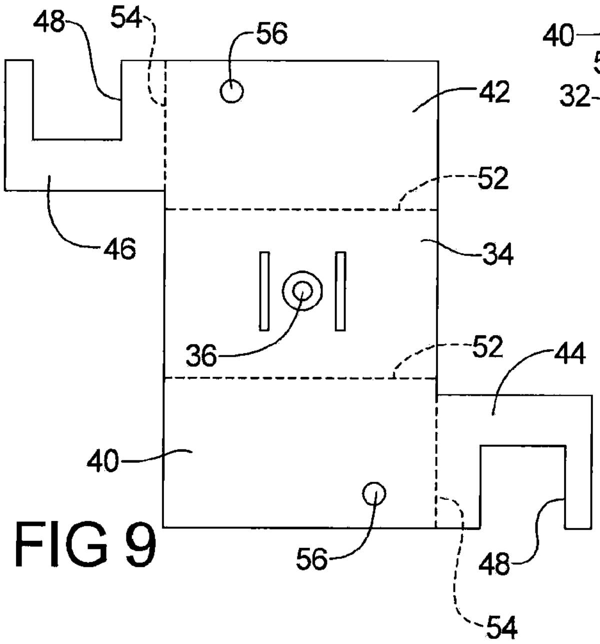
FIG 9
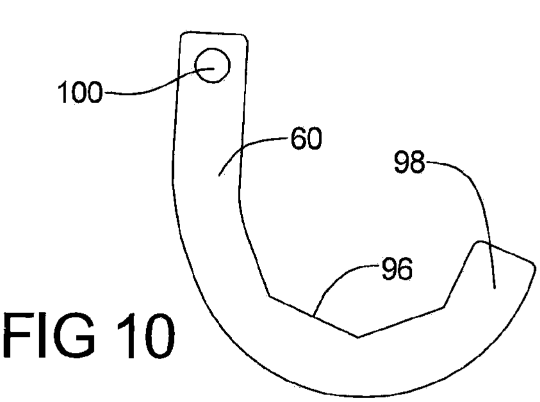
FIG 10

FIG 11
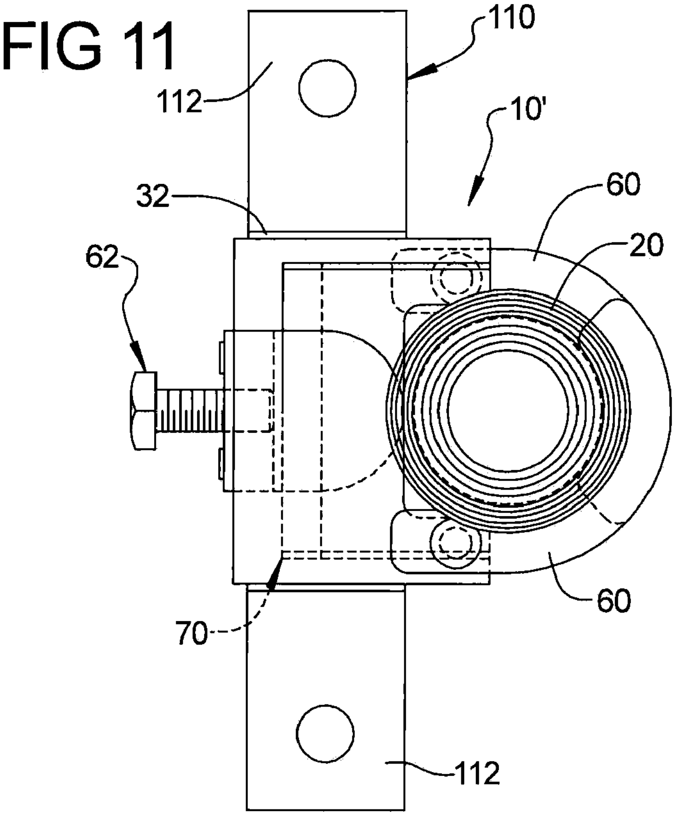
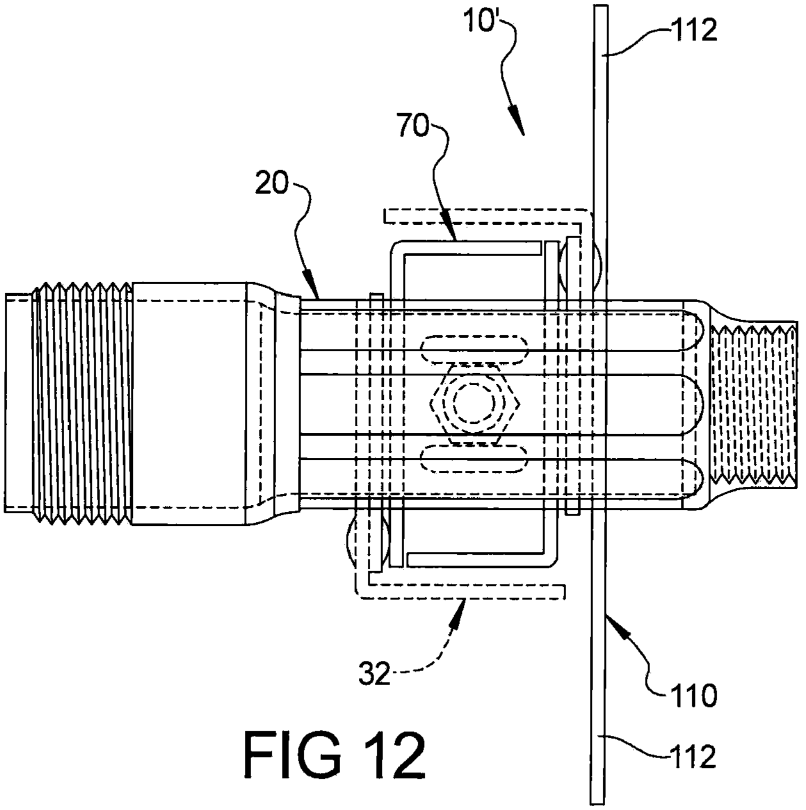
FIG 12

MOUNTING COUPLING FOR SPRINKLER SUPPORT SYSTEM

FIELD

The present disclosure relates to sprinkler support systems and more particularly, to a mounting coupling for a sprinkler support system.

BACKGROUND AND SUMMARY

The statements in this section merely provide background information related to the present disclosure and may not constitute prior art.

Currently, sprinkler support systems are used to secure a sprinkler to a ceiling or wall using a flexible hose and reducing coupling assembly. These current systems utilize a mounting bracket that is near the size of the sprinkler reducing coupling so that after the assembly is in place, the sprinkler is then assembled to the mounting bracket. The assembly of the sprinkler and the sprinkler reducing coupling to the mounting bracket applies additional torque on the support system and readjustment of the sprinkler position is typically required before finally securing the assembly to align the sprinkler properly with the ceiling or wall surface. In addition, current mounting brackets require the reducing coupling to be inserted from above the ceiling or behind the wall as the connection end of the flexible hose is typically larger than the opening in the mounting coupling and will not pass through the assembly.

It is desirable in the art of sprinkler head installation to be able to assemble the sprinkler head to the flexible hose assembly prior to installation on the mounting bracket. This would allow the hose assembly to be inserted into the mounting bracket from below the ceiling or wall-side finished surface. In addition, it is desirable to be able to include a sprinkler that is attached to a reducing coupling and can be inserted into the mounting bracket from above the ceiling or behind the finished wall surface as would be desired according to any particular installation scenario.

Accordingly, a mounting coupling for a sprinkler support system is provided including an inner bracket adapted to be slidably received on a support bar and an outer bracket having a base portion with a threaded aperture and at least one jaw mount portion. The inner bracket is at least partially received by the outer bracket. A threaded fastener is engaged with the threaded aperture of the outer bracket and is engaged with the inner bracket to apply a securing force to the mounting coupling. At least one pivot jaw is mounted to the at least one jaw mount portion. The at least one jaw being adapted to engage one of a sprinkler head and a sprinkler coupling, such as a reducing coupling. The mounting coupling allows for the sprinkler to be preassembled to the flexible hose and reducing coupling prior to installation in the mounting coupling. Opening of the pivot jaw or jaws prior to insertion of the sprinkler head or sprinkler coupling and tightening of the adjustment screw, allows the sprinkler head and coupling to be securely mounted to the mounting coupling from above or below the ceiling level. It should be noted that the mounting coupling of the present disclosure can also be utilized on a wall mount system.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2 is a perspective view of a mounting coupling securely engaging a sprinkler head reducer coupling mounted thereto;

FIG. 3 is a perspective view similar to FIG. 2 showing the mounting coupling in a released state allowing the reducer coupling to be inserted into the jaws of the mounting coupling;

FIG. 4 is a top plan view of the mounting coupling securely mounted to the reducer coupling;

FIG. 5 is a top plan view showing the mounting coupling in a released state allowing for the insertion of the reducer coupling;

FIG. 8 is a perspective view of an outer bracket of the mounting coupling;

FIG. 9 is a plan view of a stamping used for making the outer bracket;

FIG. 10 is a perspective view of a pivot jaw having a polygonal engagement surface according to the principles of the present disclosure;

FIG. 11 is a top plan view of the mounting coupling engaged with a reducer coupling and provided with a mounting strap for mounting to a side wall according to the principles of the present disclosure; and FIG. 12 is a side view of the mounting coupling and mounting strap as shown in FIG. 11.

DETAILED DESCRIPTION

Figure 1:
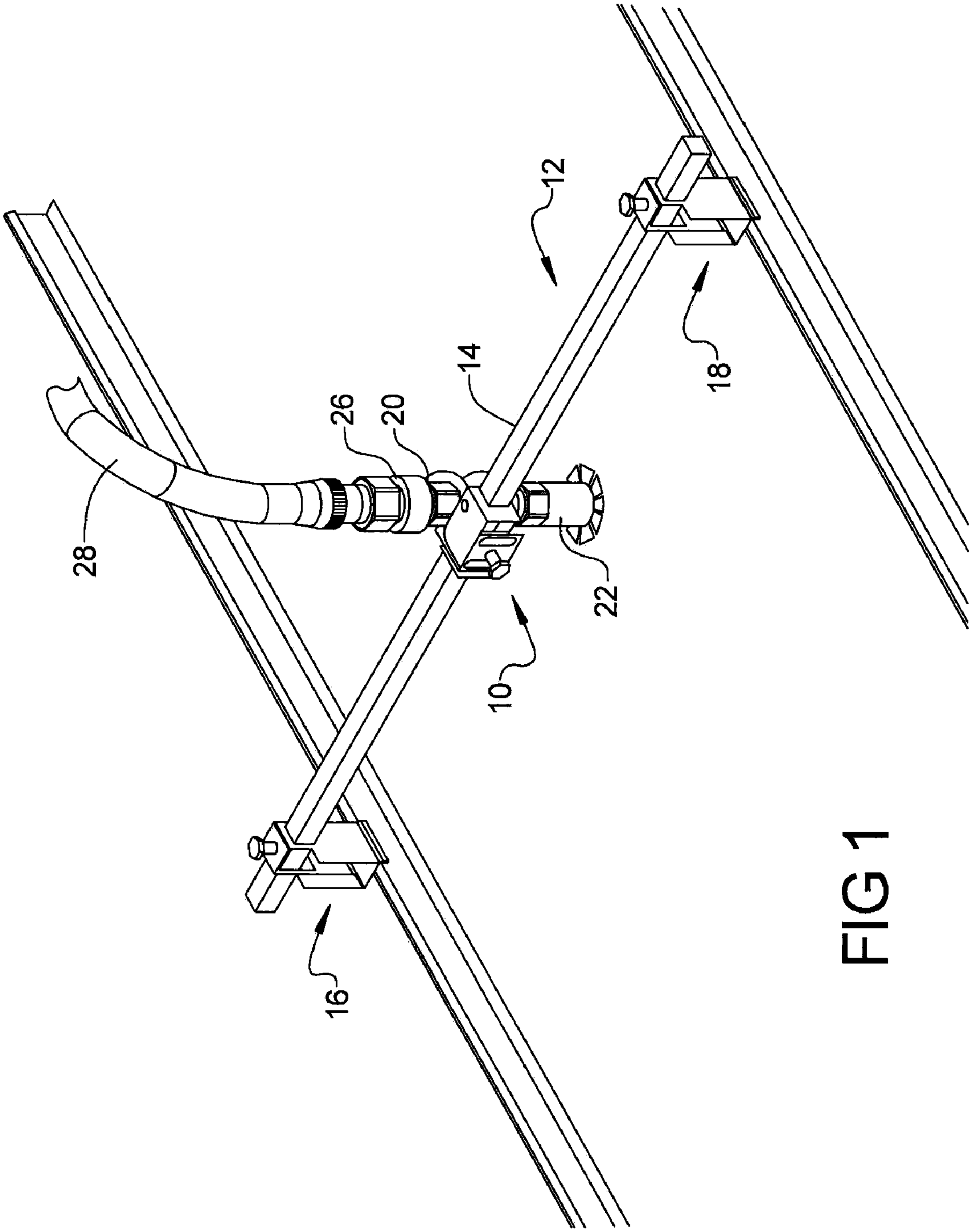
FIG. 1 is a perspective view of a sprinkler support system incorporating a mounting coupling according to the principles of the present disclosure.

The following description is merely exemplary in nature and is not intended to limit the present disclosure, application, or uses.

With reference to FIGS. 1-10 the mounting coupling 10 according to the principles of the present disclosure will now be described. The mounting coupling 10 is provided for use with a sprinkler head support system 12 which can include a support bar 14 extending between mounting brackets 16, 18. The mounting brackets 16, 18 can be adapted for engagement with T-bars of a suspended ceiling system or alternatively can be adapted to engage other structures such as c-bar structures and other ceiling frame structures.

The mounting coupling 10 is adapted to be slidably received on the support bar 14 and is adapted to engage a reducer coupling 20 or alternatively can be connected directly to a sprinkler head 22 or other pipe. The reducer coupling 20 preferably has a polygonal surface 24, a first threaded end 26 for attachment to a flexible hose 28 and a second end 30 having internal threads for attachment to a sprinkler head 22.

With reference to FIGS. 2-4, 8 and 9, the mounting coupling 10 includes an outer bracket 32 having a base portion 34 with a threaded aperture 36 and one or more jaw mount portions 38, best shown in FIG. 8. The jaw mount portions 38 are disposed on an upper and a lower wall 40, 42 extending from opposite edges of the base portion 34. A pair of end walls 44, 46 are provided with u-shaped channels 48 for receiving the support bar 14 therein. The outer bracket 32 is formed from a single stamping 50 as illustrated in FIG. 9. The upper and lower walls 40, 42 extend from the base portion 34 and are bent along dashed lines 52 so as to be perpendicular to the base portion 34. The end walls 44, 46 extend from respective ones of the upper and lower walls and are bent along dashed lines 54 so as to be perpendicular to the upper and lower walls 40, 42, respectively. The end walls 44, 46 are each provided with the u-shaped channels 48. The upper and lower walls 40, 42 are each provided with pivot jaw mounting portions 38 each having an aperture 56 therein for pivotally mounting the pivot jaws 60 thereto. The base portion 34 includes the threaded aperture 36 adapted for receiving a securing screw 62 therein.

Figure 6:
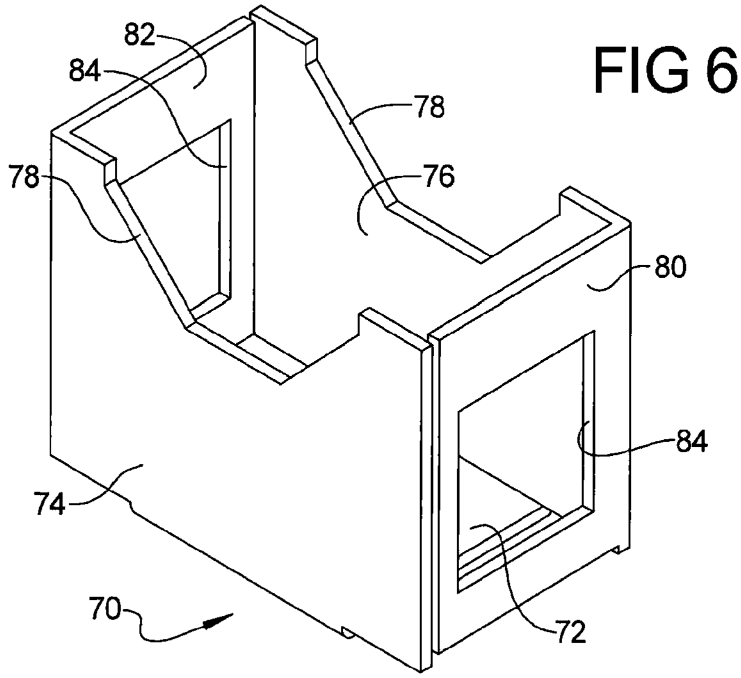
FIG. 6 is a perspective view of an inner bracket of the mounting coupling according to the principles of the present disclosure.
Figure 7:
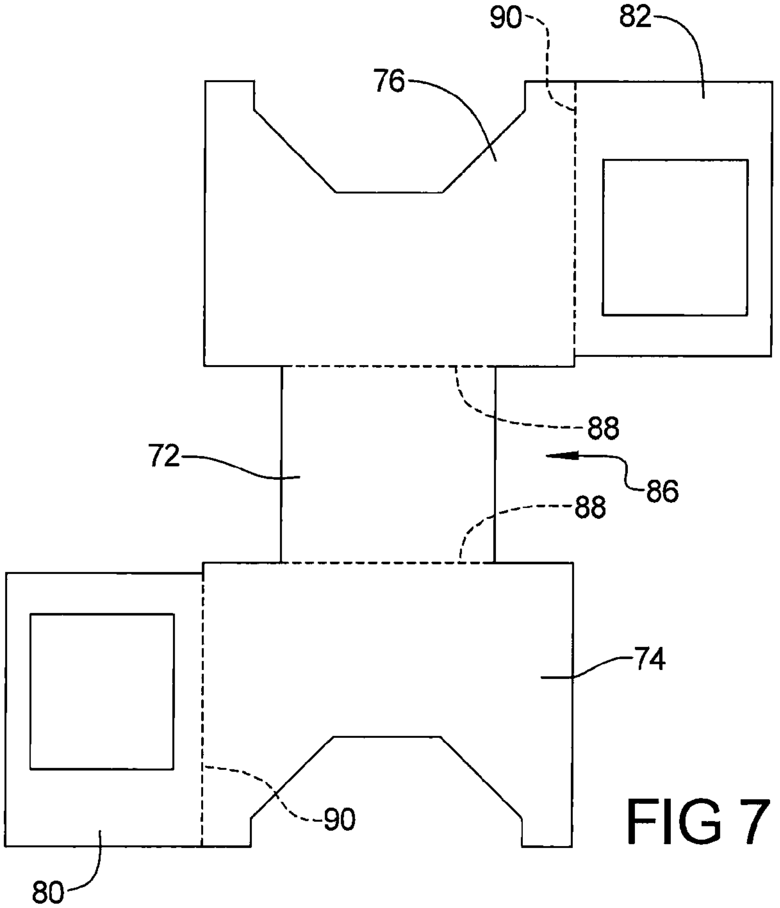
FIG. 7 is a plan view of a stamping utilized for forming the inner bracket of FIG. 6.

The mounting coupling 10 also includes an inner bracket 70, best shown in FIG. 6. The inner bracket 70 includes a base wall 72 and upper and lower walls 74, 76 extending from opposite edges of the base wall 72. The upper and lower walls 74, 76 each include a polygonal recess 78 adapted to engage the polygonal surface 24 of the reducer coupling 20. A pair of end walls 80, 82 are each provided with an aperture 84 extending therethrough. The apertures 84 are adapted to receive the support bar 14 therethrough. The inner bracket 70 is formed from a single stamping 86, as best shown in FIG. 7. The upper and lower falls 74, 76 are bent along dashed lines 88 so as to be generally perpendicular to the base portion 72. The end walls 80, 82 are bent relative to the upper and lower walls 74, 76, respectively along dashed lines 90 so as to be generally perpendicular to the upper and lower walls 74, 76.

With reference to FIG. 2, the mounting coupling 10 is shown with the inner bracket 70 received within the outer bracket 32. The support bar 14 extends through the apertures 84 in the inner bracket 70 and through the U-shaped recesses 48 of the outer bracket 32. The jaws 60 are pivotally connected to the jaw mounting portions 38 of the outer bracket 32 and engage the polygonal surface 24 of the reducer coupling 20 as illustrated in FIGS. 2 and 4, the fastener 62 is tightened so that an end portion 92 presses against the base portion 70 of the inner bracket, causing the jaws 60 to pull toward the support bar 14 and securely engage the reducer coupling 20. When the fastener 62 is loosened, the outer bracket 32 is able to move relative to the inner bracket 70 so that the tension on the jaws 60 is released, thereby allowing the jaw 60 to open up to receive the reducer coupling 20. The tightening of the screw again would apply a force drawing the jaws 60 toward the support bar 14 for secure engagement with the reducer coupling 20.

With reference to FIG. 10, a jaw 60 is illustrated including a polygonal engagement surface 96 disposed on the end of a J-shaped hook portion 98. The pivot jaw 60 includes an aperture 100 adapted to receive a rivet 102 or other fastening means for pivotally mounting the pivot jaw 60 to the mounting portions 38 of the outer bracket 32.

With reference to FIGS. 11 and 12, the mounting coupling 10' can be utilized for mounting a fire sprinkler horizontally through a wall having parallel support studs that run vertically or on a block wall that is solid or hollow. The mounting coupling 10' is provided with a flat plate 110 having mounting tabs 112 that extend past the overall width of the mounting coupling 10' and which are offset from the opening of the insertion centerline of the sprinkler reducer coupling 20. The tabs 112 are attached to the wall directly with lag bolts or direct to a cross support bracket that is attached to the parallel wall support studs. This securely locates the mounting coupling to the wall support framework or concrete wall, and the jaws 60 open to allow clearance of an assembled flexible hose 28, reducer coupling 20 and sprinkler head 22 to pass through during insertion from either side of the wall. When the sprinkler head is properly positioned in relation to the finished wall surface as required, the adjusting screw 62 is tightened to push the inner bracket 70 toward the reducing coupling 20 and causing the outer bracket 32 and jaws 60 to securely engage the reducer coupling 20. It should be noted that the reducer coupling 20 can be provided with various lengths to accommodate thicker wall or ceiling surfaces and also can be made in a 90 degree angle shape to reduce the space required for the flexible hose in a bent position.

The mounting coupling of the present disclosure provides an adjustable opening to allow for the insertion of an assembled sprinkler head, reducer coupling and flexible hose. Previous mounting couplings were sized so as to not permit a sprinkler head to be preassembled to the reducer coupling prior to installation on the mounting coupling. The adjustable opening of the mounting coupling of the present disclosure provides improved installation which is easier and faster than previous mounting couplings. In addition, the adjustable opening allows the components to be inserted from either above or below ceiling height and allows the adjustable bracket assembly to be positioned around the reducing coupling and securely locked in place with a single adjusting screw. The single adjusting screw also positions the mounting coupling laterally along the support bar. The bracket assembly is formed of an inner and outer bracket which are each easily formed from a single stamping so that the manufacturing cost and complexity are greatly reduced.

What is claimed is:

1. A sprinkler support system, comprising:

a sprinkler head or sprinkler coupling;

a support bar;

a bracket system slidably received on said support bar, said bracket system including at least one jaw mount portion;

a threaded member coupled to the bracket system; and at least one pivot jaw pivotally mounted to said at least one jaw mount portion, said threaded member configured to be tightened along an axis substantially perpendicular to said support bar to draw said at least one pivot jaw along a direction of said axis toward said support bar such that said pivot jaw securely engages said sprinkler head or sprinkler coupling and secures said sprinkler head or sprinkler coupling and said bracket system in place.

2. The sprinkler support system according to claim 1, wherein said bracket system includes a pair of jaw mount portions and a pair of pivot jaws are mounted to respective ones of said pair of jaw mount portions.

3. The sprinkler support system according to claim 1, wherein said bracket system includes an inner bracket and an outer bracket, said inner bracket slidably received on said support bar and said outer bracket receiving at least a portion of said inner bracket therein;

wherein tightening said threaded member causes said outer bracket to translate relative to said inner bracket and said support bar so as to draw said at least one pivot jaw tightly toward said support bar.

4. The sprinkler support system according to claim 3, wherein said outer bracket further comprises a pair of spaced apart sidewalls each having a channel configured to receive said support bar therein, and wherein said threaded member is threadably coupled to said outer bracket and configured to engage said inner bracket when tightened to draw said at least one pivot jaw toward said support bar.

5. The sprinkler support system according to claim 1, wherein said at least one pivot jaw is pivotally mounted to said at least one jaw mounting portion by a rivet.

6. The sprinkler support system according to claim 1, wherein said at least one pivot jaw includes an engagement surface having a shape substantially corresponding to a shape of an exterior of said one of the sprinkler coupling and sprinkler head, said engagement surface configured to continuously wrap around an exterior portion of said one of the sprinkler coupling and sprinkler head opposite said support bar such that said engagement surface extends along both sides of a central axis extending through a center of said one of the sprinkler coupling and sprinkler head and perpendicular to said support bar.

7. A sprinkler support system, comprising:

a sprinkler coupling or sprinkler head;

a support bar;

a bracket adjustably coupled to said support bar;

a pair of pivot jaws pivotally mounted to said bracket, said pair of pivot jaws arranged to engage said sprinkler coupling or a sprinkler head; and a single threaded member coupled to said bracket, said threaded member arranged to be tightened along an axis substantially perpendicular to said support bar such that when said single threaded member is drawn tight, the pair of pivot jaws are drawn toward said support bar along a direction of the axis and into tight engagement with said sprinkler coupling or sprinkler head to secure said sprinkler coupling or sprinkler head in place and said bracket in place relative to said support bar.

8. The sprinkler support system of claim 7, wherein said sprinkler coupling or sprinkler head includes an exterior having a polygon shape, and wherein said pair of pivot jaws include an engagement surface having a polygon shape substantially corresponding to said sprinkler coupling or sprinkler head polygon shape, said engagement surface configured to continuously wrap around an exterior portion of the sprinkler coupling or sprinkler head opposite said support bar such that said engagement surface extends along both sides of a central axis extending through a center of said sprinkler coupling or sprinkler head and perpendicular to said support bar.

9. The sprinkler support system of claim 7, wherein said bracket includes an inner bracket and an outer bracket, said inner bracket including a pair of apertures configured to slidably receive said support bar therethrough, said outer bracket including an upper wall and a lower wall spaced apart from said upper wall and configured to receive at least a portion of said inner bracket therebetween such that said support bar is positioned between said upper and lower walls.

10. The sprinkler support system of claim 7, wherein said sprinkler coupling or sprinkler head includes an exterior surface having a polygon shape.

11. The sprinkler support system of claim 7, wherein each of said pair of pivot jaws includes an engagement surface having a shape configured to substantially correspond to at least an engageable portion of an exterior surface of said sprinkler coupling or sprinkler head.

12. A sprinkler support system, comprising:

a support bar;

a bracket adjustably coupled to said support bar, said bracket including an inner bracket and an outer bracket, said inner bracket including a pair of apertures configured to slidably receive said support bar therethrough, said outer bracket including an upper wall and a lower wall spaced apart from said upper wall and configured to receive at least a portion of said inner bracket therebetween such that said support bar is positioned between said upper and lower walls;

a pair of pivot jaws, wherein one of said pair of pivot jaws is pivotally coupled to said upper bracket wall and the other of said pair of pivot jaws is pivotally coupled to said lower bracket wall, said pair of pivot jaws arranged to engage a sprinkler coupling or a sprinkler head; and a single threaded member coupled to said bracket, said threaded member arranged to be tightened along an axis substantially perpendicular to said support bar such that when said single threaded member is drawn tight, the pair of pivot jaws are drawn toward said support bar along a direction of the axis and into tight engagement with said sprinkler coupling or sprinkler head.

13. The sprinkler support system of claim 12, wherein said threaded member is threadably coupled to said outer bracket and configured to engage said inner bracket.

14. A sprinkler support system, comprising:

a support bar;

a bracket adjustably coupled to said support bar, said bracket including an inner bracket and an outer bracket, said inner bracket including a pair of apertures configured to slidably receive said support bar therethrough, said outer bracket including an upper wall and a lower wall spaced apart from said upper wall and configured to receive at least a portion of said inner bracket therebetween such that said support bar is positioned between said upper and lower walls;

a pair of pivot jaws pivotally mounted to said bracket, said pair of pivot jaws arranged to engage a sprinkler coupling or a sprinkler head; and a single threaded member coupled to said bracket, said threaded member arranged to be tightened along an axis substantially perpendicular to said support bar such that when said single threaded member is drawn tight, the pair of pivot jaws are drawn toward said support bar along a direction of the axis and into tight engagement with said sprinkler coupling or sprinkler head;

wherein said upper and lower walls of said outer bracket each include an engagement surface having a polygon shape configured to substantially correspond to at least an engageable portion of an exterior surface of said sprinkler coupling or sprinkler head.

15. The sprinkler support system of claim 14 wherein said pair of pivot jaws are coupled to said respective upper and lower walls adjacent opposite lateral sides thereof such that a portion of one of said pivot jaws is configured to extend along a first side of said sprinkler coupling or sprinkler head and a portion of said other pivot jaw is configured to extend along an opposite side of said sprinkler coupling or sprinkler head.

* * * * *